United States Patent [19]

Leach

[11] Patent Number: 4,524,862
[45] Date of Patent: Jun. 25, 1985

[54] SCREW-JACK TYPE ACCUMULATION CONVEYOR

[76] Inventor: John M. Leach, P.O. Box 544, Walpole, N.H. 03608

[21] Appl. No.: 420,025

[22] Filed: Sep. 20, 1982

[51] Int. Cl.³ .............................................. B65G 13/06
[52] U.S. Cl. .................................. 198/781; 74/89.15; 198/789
[58] Field of Search ............... 198/781, 789, 790, 791, 198/854; 74/212, 89.15

[56] References Cited

U.S. PATENT DOCUMENTS

| | | | |
|---|---|---|---|
| 3,116,823 | 1/1964 | Schneider | 198/809 |
| 3,136,406 | 6/1964 | De Good et al. | 198/781 X |
| 3,156,345 | 11/1964 | De Good | 198/781 |
| 3,164,246 | 1/1965 | De Good | 198/781 X |
| 3,206,008 | 9/1965 | Bowman et al. | 198/809 X |
| 3,219,172 | 11/1965 | Harrison | 198/781 |
| 3,225,893 | 12/1965 | Currie | 198/781 |
| 3,232,415 | 2/1966 | Gotham | 198/781 |
| 3,253,697 | 5/1966 | De Good et al. | 198/781 |
| 3,285,391 | 11/1966 | Fix | 198/781 |
| 3,400,806 | 9/1968 | Leach | 198/781 |
| 3,451,527 | 6/1969 | Leach | 198/781 |
| 3,537,568 | 11/1970 | Leach | 198/781 |
| 3,589,496 | 6/1971 | Leach | 198/781 |
| 3,877,565 | 4/1975 | Werntz | 198/781 |
| 3,895,545 | 7/1975 | Hunter | 74/212 X |
| 4,103,769 | 8/1978 | Jorgensen | 198/789 X |
| 4,109,783 | 8/1978 | Vogt | 198/789 X |
| 4,172,519 | 10/1979 | Leach | 198/781 |
| 4,204,593 | 5/1980 | Leach | 198/781 |
| 4,212,385 | 7/1980 | Leach | 198/781 |
| 4,238,029 | 12/1980 | Pirro, Jr. | 198/789 X |
| 4,301,914 | 11/1981 | Krammer | 198/790 X |
| 4,344,527 | 8/1982 | Vogt et al. | 198/781 |

Primary Examiner—Joseph E. Valenza
Assistant Examiner—Stuart J. Millman

[57] ABSTRACT

An article accumulation conveyor in which the drive for moving the articles is automatically discontinued for a selected section of the conveyor when an article is stopped on another section of the conveyor and is started again automatically when the article moves. The power for activating the starting and stopping instrumentalities is furnished in its entirety by the conveyor drive so that all need for extraneous power sources or forces exerted by a moving article is entirely eliminated. The activating power is transmitted by a "screw-jack" type of device so that enormous force can be furnished to the article carrying rollers which makes it possible to carry both small and large, light or heavy articles on the same conveyor at the same time.

10 Claims, 8 Drawing Figures

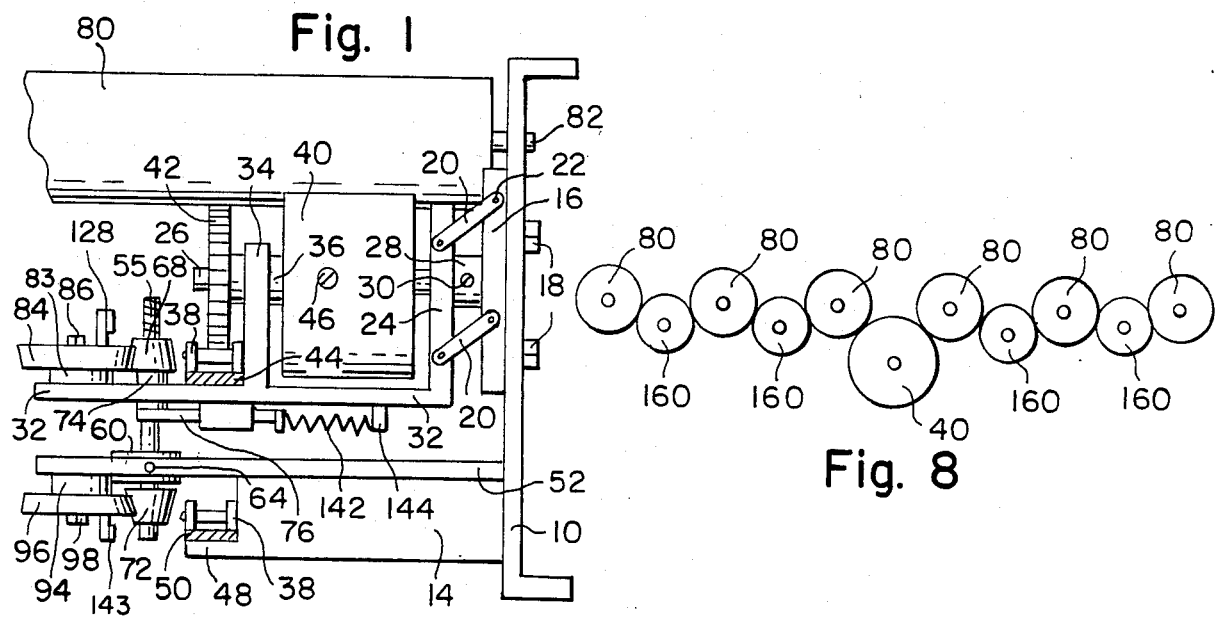
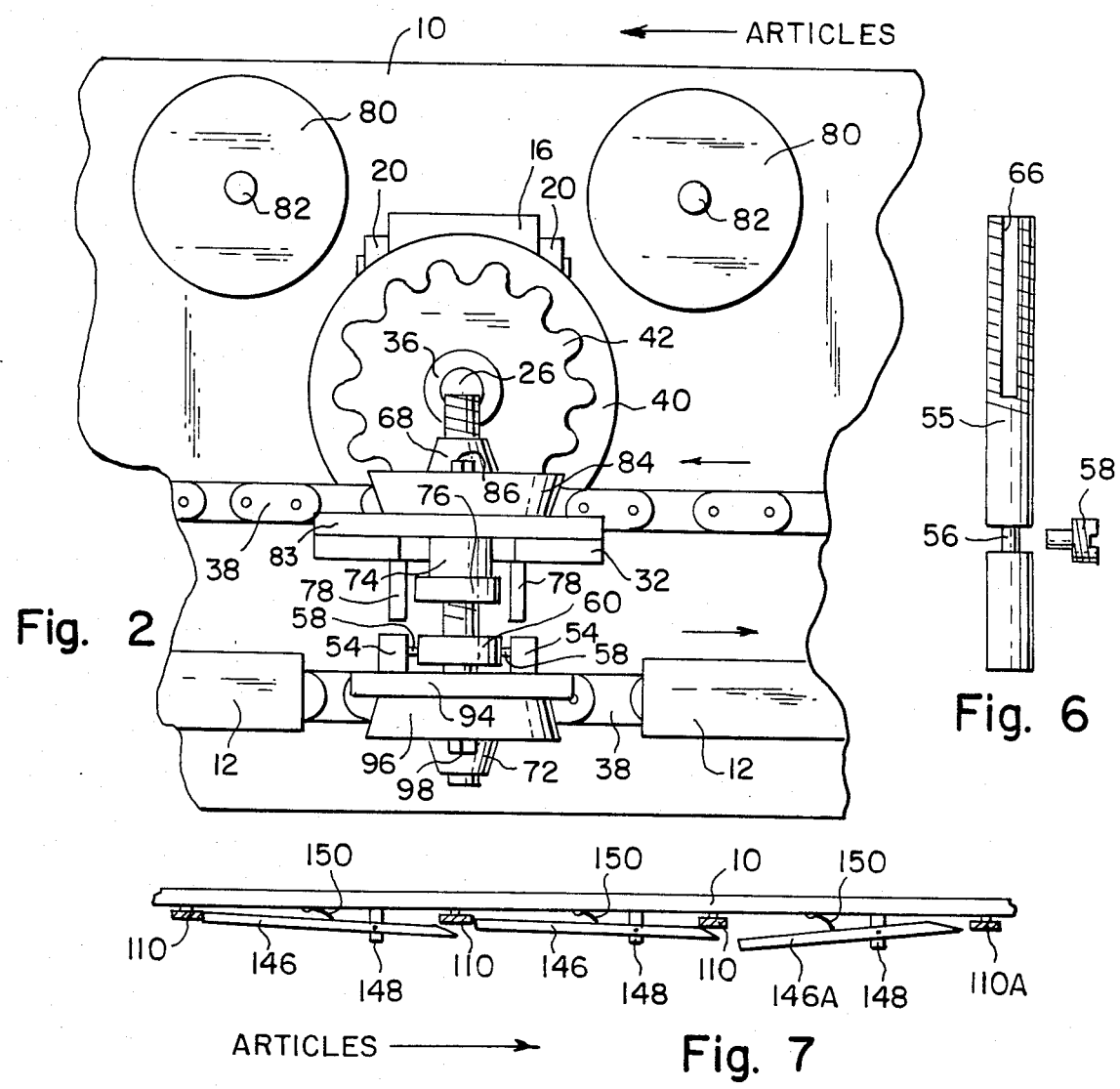

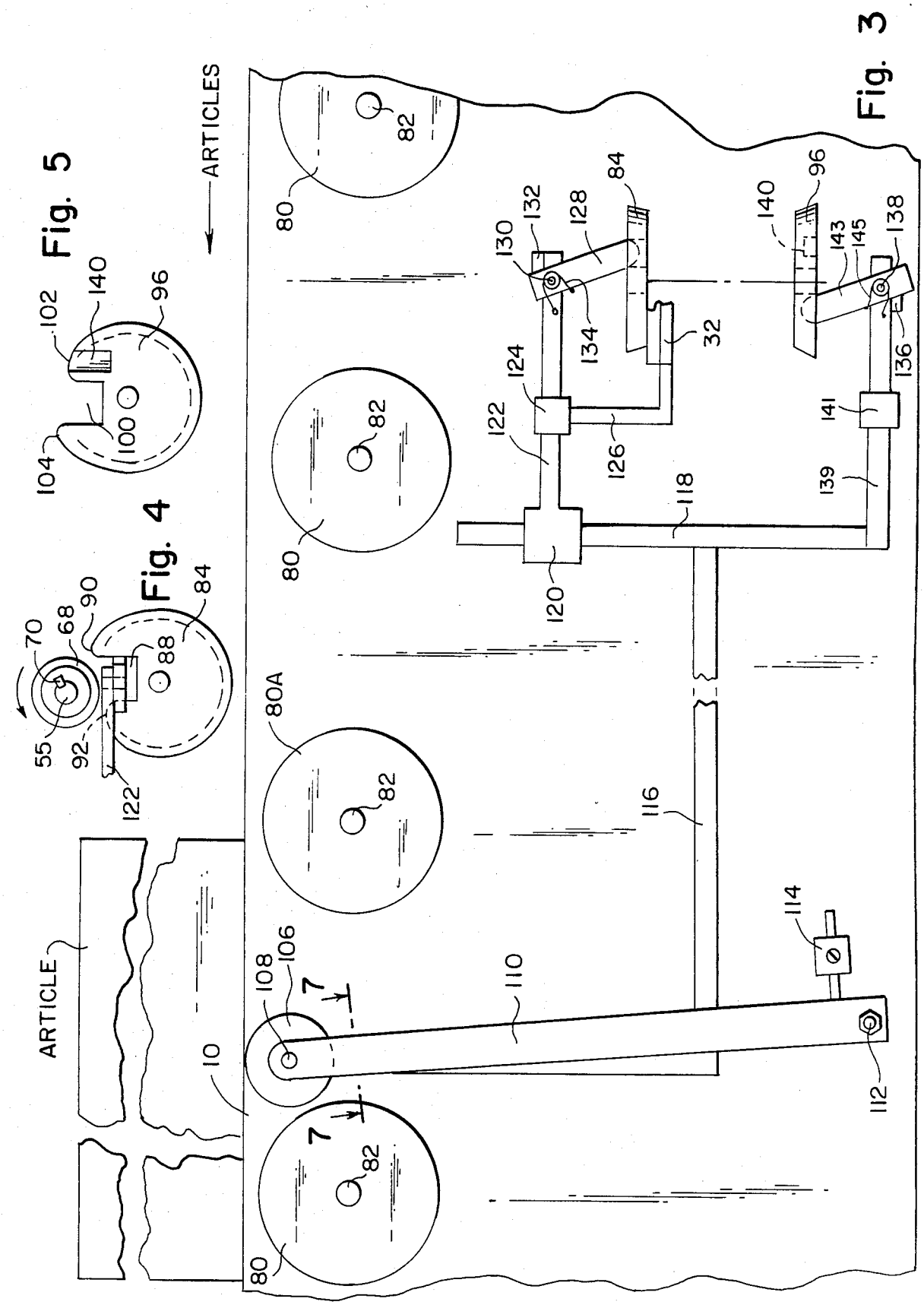

SCREW-JACK TYPE ACCUMULATION CONVEYOR

BACKGROUND OF THE INVENTION

In the accumulation conveyor field it has long been desired to have a unit which can handle large, heavy articles and small, light articles on the same unit.

In prior accumulation conveyors where the force required to discontinue the conveyor drive when an article was stopped on the unit and to start the drive when the stopped article again should move has usually been provided a sensor operated either by the weight or movement of an article, or by both.

This meant that small or light articles could not operate a clutch or the like of sufficiently heavy duty for the conveyance of heavy articles so that light and heavy articles could not be mixed unless some extraneous power such as air or electricity was resorted to which required complicated mechanisms, was expensive and required space and much maintenance. An example of such a unit is disclosed in U.S. Pat. No. 3,225,893.

Efforts have been made to produce accumulation conveyors in which the power required to operate the clutches to continue or discontinue the movement of articles is provided by the conveyor drive which moves the articles conveyed, but to date such equipment has been so complicated as to be prohibitively expensive, undependable, require extensive adjustment, other maintenance, or all of these undesirable factors. Examples of such units are disclosed in U.S. Pat. Nos. 3,219,172; 3,285,391; 3,156,345; 3,116,823; 3,164,246; 3,206,008; 3,136,406, and 3,232,415.

SUMMARY OF THE INVENTION

It is an object of the present invention to provide an article accumulation conveyor on which light and/or small and heavy and/or large articles can be mixed at will on the conveyor without any untoward results and conveyed with full dexterity and freedom from trouble.

It is another object of the present invention to provide an article accumulation conveyor in which the power required to discontinue and continue the drive for the main conveyor is taken from the main conveyor drive itself.

It is a further object of the present invention to provide a power take-off from the main conveyor drive itself which is simple, dependable, inexpensive, and adds very few additional parts to the main conveyor itself.

Other objects and advantages of the present invention will be apparent to those skilled in the art upon recourse to the following specifications, claims and drawings.

BRIEF DESCRIPTION OF THE DRAWINGS OF THE PRESENT INVENTION

The novelty of the present invention resides primarily in the mechanism of the area of an article accumulation conveyor which brings about the accumulation function, and since this area is duplicated frequently along the length of the conveyor, the drawings have been limited to just one of these mechanisms and details of well known conveyor structure have been eliminated wherever not needed in order to more clearly disclose the invention. This in no way is to be considered a waiver to coverage of any number of these mechanisms in a conveyor or similar system or unit.

FIG. 1 is a fragmentary view of a roller conveyor including a side view of the mechanism of a preferred embodiment of the present invention.

FIG. 2 is an end view of the same mechanism with some of the components of the sensor control removed in order to more clearly disclose the drive components.

FIG. 3 is a side view of the sensor control components of the mechanism of the present invention.

FIG. 4 is a top view of some of the same components.

FIG. 5 is a bottom view of other of the same components.

FIG. 6 is a side view of the vertical movement producing screw of the present invention.

FIG. 7 is a fragmentary view of a system for eliminating unnecessary operation of the accumulating mechanism of this invention.

FIG. 8 is a diagrammatic view of a roller arrangement described.

DESCRIPTION OF THE PREFERRED EMBODIMENTS OF THE PRESENT INVENTION

The frame of the accumulation conveyor of the present invention is essentially the same as that shown in applicant's prior U.S. Pat. No. 3,589,496 and comprises side rails 10 and supporting legs (not shown) and provided with article supporting and moving units preferably in the form of rollers 80 suitably mounted for free rotation on shafts 82 supported by the side rails 10 and which form an article path.

At a distance below the rollers 80 a powered driving element for the rollers 80 is positioned and can be a band, belt, chain or any equivalent member which will accomplish the desired function. A chain 38 is preferred in this application of the invention. The chain 38 is carried by a sprocket at each end and is powered by any desired type of prime mover such as the usual gear motor or reducer-motor combination (not shown).

The lower run of the chain 38 is carried in enclosed guides 12 (see FIG. 2) which are supported from a side rail 10 by brackets such as 14 shown in FIG. 1.

A plate 16 is bolted in place on a side rail 10 by two cap screws 18 and is centered between two rollers 80 as shown in FIG. 2. The cap screws are threaded into the plate 16. Four levers 20 are pivotally mounted on four side extension studs carried two by the plate 16 and two by a second plate 24 as shown in FIG. 1. This enables plate 24 to be moved up and down while remaining exactly parallel to plate 16 regardless of any direction diverting forces applied to plate 24.

The right hand end of a stud shaft 26 extends through a suitable opening in the plate 24 and into a collar 28 suitably attached to the plate 24, but the stud shaft 26 is not attached to the plate 16, and is retained in place by a set screw 30. The collar 28 also serves as a lower position stop for the movable plate 24 as shown in FIG. 1.

A platform member 32 is suitably attached to the lower end of the plate 24 and extends to the left as shown in FIG. 1, and carries a suitably attached vertical standard 34. Standard 34 is drilled to receive a shaft 36 therethrough for rotary movement therein. The shaft 36 is center drilled to fit over the stud 26 and rotate thereon. A friction motion transmission drum 40 is center drilled to fit snugly over the shaft 36 and is fastened in position by one or more deep seated set screws 46 or in any other well known way. A sprocket 42 is pressed, keyed, cemented or in any other desired way fixed onto the left hand end of shaft 36 so that the sprocket 42 and drum 40 rotate together on the stud 26. The drum 40 may be formed in any desired way but is preferably formed of a steel, plastic, wood or any other desired material base with an outer covering of wear resistant material such as a thin band of polyurethane or other desired material of that type. The sprocket may be metal, plastic or other desired material.

A strip 44 of polyurethane or other desired wear resistant matial is suitably attached to the platform 32 under the sprocket 42 to act as a support for the upper run of the chain 38. Through this arrangement, movement of the chain 38 causes rotation of the friction drum 40, and platform 32, sprocket 42, drum 40 and the upper run of chain 38 or at least the part thereof supported by platform 32 can be moved up and down by movement of platform 32 so as to cause the perimeter of drum 40 to contact and release from two rollers 80. In this manner the two rollers 80 will be rotated when in contact with the drum 40 and not rotated when not in contact with the drum 40.

A bracket 14 is suitably attached to a side rail 10 and extends outwardly to the left as viewed in FIG. 1 and is provided at the outer end with a projection 48 which supports a pad of wear resistant material 50 such as polyurethane which supports a short section of the lower or return run of the chain 38 which extends between the open ends of the chain guide 12 shown in FIG. 2. A second and fixed position platform 52 is suitably attached to the bracket 14 and extends over and beyond the projection 48 as shown in FIG. 1 and provided with a bifurcated end having the sections 54—54 leaving a space between them as shown in FIG. 2.

A rod 55 is left-hand threaded over one end and provided with a reduced diameter section 56 near the other end as shown in FIG. 6. The reduced diameter section receives the unthreaded ends of two set screws, one of which is also shown at 58 in FIG. 6, when the rod 55 is placed in a collar 60 placed between the sections 54 of the platform 52 and the two set screws 58 set into the threaded openings 64, see FIG. 1, one through each of the sections 54 so that the unthreaded ends extend through the collar and into the reduced diameter section of rod 55, see FIG. 2. This provides a pivotal mounting for the rod 55 so that it can freely swing right and left in a vertical plane as viewed in FIG. 1. Also the rod 55 cannot move lengthwise but can freely rotate because the set screws 58 do not extend in far enough to contact the vertical wall of the reduced diameter section of the rod 55.

The rod 55 is provided with a keyway 66 as shown in FIG. 6. A friction driven roller boss 68 is provided with a bore which fits slidably over the threaded area of rod 55 and is provided with a spline 70 (see FIG. 4) which will slide in the keyway 66 of the rod 55 so that the rod and boss must rotate together but the boss can slide up or down on the threaded area of the rod 55. The cylindrical surface of the boss 68 is beveled so that when the rod 55 is tilted to the right as seen in FIG. 1, the side surface of the boss 68 will lie flat against the side of the upper run of the chain 38 so that movement of the chain lengthwise will rotate the boss 68 and the rod 55.

A second friction roller boss 72 the same as boss 68 except that it is bored to fit snugly over the unthreaded area near the lower end of rod 55 and has no spline and is force fitted onto the rod or otherwise non-rotatably attached to rod 55 as desired.

This means that when the rod 55 is tilted to the right, FIG. 1, so that the side surface is in snug contact with the side surface of the upper run of the chain 38, the boss 68 and the rod 55 will be rotated counter-clockwise when the upper run of chain 38 is moved in a direction into the paper, and when the rod 55 is tilted so that side surface of boss 72 is in snug contact with the side surface of the lower run of the chain 38, the boss 72 and the rod 55 will be rotated clock-wise when the lower run of the chain 38 is moved in a direction out of the paper.

A nut 74, FIG. 2, threaded internally to fit the threads on the rod 55 is placed in the position on rod 55 shown in FIG. 2 before the boss 68 is placed on the rod 55. A blade 76 is attached in any desired manner, such as brazing, to the bottom of the nut 74 after the blade is drilled to fit loosely over the threaded area of the rod. The blade 76 contacts the under side of the platform 32 so that movement of the nut upwardly will move the platform 32 upwardly as well as all of the components supported by the platform 32 including the roller 40.

This means that tilting the rod 55 to the right until the boss 68 contacts the side of the upper run of the chain 38 will rotate the rod 55 in the direction to move the nut 74 upwardly and the platform 32 upwardly until the drum 40 contacts the two rollers when the chain upper run is moved into the paper as viewed in FIG. 1, and the rollers 80 will be rotated by contact with the drum 40. By tilting the rod 55 to the left, FIG. 1, so that the boss 72 contacts the side of the lower run of the chain under the same conditions will lower the platform 32 so that the drum 40 breaks contact with the rollers 80 and the rollers will stop rotating.

The blade 76 is prevented from rotating and also guided in its up and down movement by guides 78 suitably attached to the underside of the platform 32 as by brazing.

In order to tilt the rod 55 left or right as required automatically, the following components are provided. A plate 83 is suitably attached to the platform 32 near the left end, see FIGS. 1 and 2. A pressure wheel 84 is mounted for rotation on the plate by a cap screw 86 threaded into the plate 83. The pressure wheel 84 is shaped as shown in the top view in FIG. 4. The side of the wheel 84 tapers downwardly and the body is cut out as shown at 88, FIG. 4, with the cut out terminating at each end in rounded areas 90 and 92.

A plate 94 is suitably affixed to the lower, fixed position platform 52 also near the left end, FIGS. 1 and 2. A pressure wheel 96 is rotatably attached to the plate 94 by a cap screw 98 which is threaded into the plate 94. The pressure wheel 96 is shaped the same as pressure wheel 84 except in reverse as shown in the bottom view FIG. 5. That is, the side of the wheel 96 tapers upwardly and the body is cut out as shown at 100 with the cut out area terminating at each end in rounded areas 102 and 104 which are side-reversed from the areas 90 and 92 of pressure wheel 84.

The article sensor components shown in FIG. 3 have been shown separately from the components of FIGS. 1 and 2 in order to keep them from shielding the view of the FIGS. 1 and 2 components and possibly causing confusion in descriptions. All components in all of the views and Figs. have been shown in the position they have when an article is resting on the article sensor roller 106 in in FIG. 3, in which position the rollers 80 are not being driven and are stationary.

Sensor roller 106 is mounted for free rotation on a stub shaft 108 carried by an arm 110 mounted for free rotation on a stud 112 affixed to a side rail 10. Stud 112 can be affixed to side rail 10 at any desired point between two rollers 80, which point is usually determined by the size of the articles to be accumulated on the conveyor. The arm 110 carries a light counterweight 114 which lightly urges the arm 110 to a position near the roller 80A shown in FIG. 3. Only a light force is required to be exerted by the counterweight 114 because very little force is required to actuate the mechanism to be now described. For this reason, when the article moves ahead off of the roller 106 and no other article is closely following, the roller 106 will move to the right under the light pressure of the counterweight 114.

When the roller 106 and its supporting arm 110 move to the right as described above an L-shaped arm 116 which is also pivoted on stub shaft 108 at its upper end also moves to the right and so moves a vertically extending rod 118 attached to it. The arm 116 is shown as broken because its actual length will depend on the actual location of the roller 106 and stud 112 as above explained.

A collar 120 is slidably mounted on the rod 118 near the top and an arm 112 suitably affixed to the collar extends to the right and passes through a guide 124 supported by an L-shaped arm 126 affixed to the movable platform 32. Thus, the arm 126, guide 124, arm 122 and collar 120 move up and down with the platform 32 and all of these components except arm 126 and guide 124 move to the right and left along with rod 118 and arm 116 with the roller 106.

The right end of arm 122 pivotally carries a pusher finger on a stud 130. A stop 132 on the arm 122 prevents the finger 128 from moving clockwise and a spring clip 134 urges the finger against counter-clockwise movement. The lower end of the pusher finger 128 rests in the cutout area 88 of pressure wheel 84, FIG. 4, when the sensor roller is held in the position shown in FIG. 3 by a package.

An arm 139 is suitably connected to the lower end of rod 118, passes through a fixed guide 141 suitably connected to the side rail 10 and has a pusher finger 143 similar to the finger 128 pivoted on the outer end on a stud 138. This finger 143 extends upwardly, has a stop 136 which prevents clockwise rotation of the finger and a clip spring 145 which urges the finger in a clockwise direction. The finger 134 rests in the cutout opening 100 of the pressure wheel 96 when the sensor roller is held by an article in in the position shown by FIG. 3.

OPERATION OF THE PRESENT INVENTION

As clearly shown in FIG. 3, each sensor roller 106 serves to control the rotation of article carrying and moving rollers 80 at some point upstream of the article flow. Just how far upstream depends on the length of the articles being accumulated. The object is to select this distance upstream so that when an article is stopped for any reason it will in turn stop the next advancing article so that it will not slam into the stopped article and create what could be a progressively increasing pressure along the line of stopped articles and damage the articles and their contents. This distance can easily be selected so that the articles just contact lightly or are spaced apart any desired distance, which latter is called singulation. Each sensor roller 106 can control the rotation of just two upstream rollers 80, or as many pairs of upstream rollers as desired by having its supporting arm 110 connected to an extended arm 116 which in turn connects with several rods 118 and their associated elements. This is a well established feature, that is, having one sensor roller control several accumulation mechanisms, and is not, per se, novel.

The starting and stopping operations are entirely automatic and it is not necessary to reset or do anything else during the operation of the invention, as will be clear from the following operation description:

When the article blocking the line of movement of the articles is allowed to move ahead, each of the following articles moves ahead in sequence as its supporting rollers are rotated as above explained.

Among many other uses, accumulation conveyors are frequently employed to provide storage lines for feeding palletizers. When the article stopping gate on the feed conveyor leading to a palletizer is raised, the articles accumulated behind the gate, which frequently form a line several hundred feet in length, automatically feed into the palletizer or palletizers and are placed on pallets for shipment or storage.

When the prime mover for the chain 38 is turned on and running and the article resting on the sensor roller, as shown in FIG. 3, moves ahead and off of the sensor roller so that the sensor roller moves over close to the roller 80A under the force created by the light counterweight 114, the arm 116 moves to the right and moves rod 118 and arms 122 and 139 to the right. The finger 143 on arm 139 likewise moves by bending to the left and slidover the lower face of the pressure wheel 96 which cannot move because at that time the roller boss 72 is projecting into the cut out opening 100 in the pressure wheel 96, see FIG. 1. The finger 143 stops at the end of the movement of arm 116 with its rounded end either resting in a depression 140 formed in the bottom face of the pressure wheel 96 or just to the right of the depression. Nothing else takes place on the part of the wheel 96 or finger 143 at that time.

At the same time that the finger 143 was moving as related above, the finger 128 pressed against the right hand edge of the cutout area of the pressure wheel 84, FIG. 4, and rotated wheel 84 slightly clockwise until rounded edge 92 pushed the periphery of boss 68 towards the upper run of chain 38 against the force of a spring 142 extending between the end of blade 76 and a block 144 affixed to the bottom of movable platform 32. The spring 142 is a combination compression and tension spring in that when no force is being applied to it it holds the rod 55 in vertical position wherein neither of the bosses 68 and 72 are in driving position against either run of the chain 38 or either one of the pressure wheels 84 or 96, FIG. 1. When the spring 142 is compressed or extended, it tends to move the rod 55 back into the vertical or neutral position.

Further slight rotation of the pressure wheel 84 by the finger 128 caused the increasing diameter of the pressure wheel 84 to move the periphery of the boss 68 into contact with the upper run of the chain 38 which took over the movement of the boss 68 so that the ever increasing diameter of the pressure wheel 84 increased the pressure between the chain 38, the boss 68 and the pressure wheel 84 very close to the same time that the finger 128 passed out of the cut out opening 88 and reached the end of its motion just clear of the periphery of the pressure wheel 84 where it remained.

When the boss 68 started to rotate the nut 74 started to thread itself and the blade 76 upwardly on the threaded part of the rod 55 which in turn moved the platform 32 and friction drum 40 upwardly towards the rollers 80. This upward movement continued until the pressure wheel made one revolution at which time the cut out area of the pressure wheel 84 came adjacent to the boss 68 and the wheel 84 stopped driving and the spring 142 forced the boss 68 away from the chain where the boss stopped and the upward movement of the platform 32 and the friction drum 40 stopped which left the drum 40 to continue driving the rollers 80. The chain 38 is of course moved upwardly along with the sprocket 42 so that this driving of the rollers 80 by the drum 40 continues indefinitely as long as the roller 106 remains in its upper or higher position.

The collar 120 moved upwardly along the rod 118 as the platform 32 moved upwardly.

When another article moves onto and pushes the sensor roller 106 back to the position shown in FIG. 3, the arm 116, rod 118, collar 120, arms 122, 139 and fingers 128 and 143 moved to the left. The finger 128 when it struck the pressure wheel 84 which could not move because of the interference by the boss 68 deflected to the right and moved across the wheel 84 and snapped into the cut out area 88 as shown in FIG. 4.

The finger 143 either was projecting into the depression 140 in the pressure wheel 96 or snapped into it and rotated the pressure wheel counter-clockwise and the rounded edge portion 102 contacted the boss 72 and moved it into contact with the side of the moving lower chain run 38 which caused the chain to pick up the rotation of the boss 72 and the pressure wheel until it made one revolution and the rounded edge portion 104 snapped over the finger 143 and stopped because the boss 72 was then adjacent to the cut out area 100 and was moved into the cut out area by the spring 142 and all of the components again resumed the positions shown in FIG. 3 because the rod 155 had been rotated counter-clockwise by the chain 38 which threaded the nut 74 downwardly on the threaded portion of the rod 155 which lowered the drum 40 out of contact with the rollers 80 which stopped along with any article carried by them.

It will be noted that the loose fit of the blade 76 between the guides 78, FIG. 2, and the slight flexibility in the arms 20, FIG. 1, enable the movable platform 32 and the drum 40 to divert slightly sideways as the drum 40 moves into position between the rollers 80 which always causes the drum 40 to be accurately centered between the rollers and thus equalize the driving forces imparted to the rollers 80 by the drum 40 which automatically compensates for any wear on the drum 40 or any other parts. Such action is not possible when the drum is mounted so as to be swung up between the rollers from one side, as is the common practice.

When articles are flowing freely along the conveyor before they start to accumulate it is not necessary nor desirable that the accumulation mechanisms described above be operated by depression of each sensor roller 106 passed over by the articles as they pass along the conveyor. In order to avoid this unnecessary operation of the accumulation mechanisms, the simple leverage system illustrated in FIG. 7 can be used.

Just the actual components of the present invention involved in this system has been shown in FIG. 7 in order to emphasize the extreme simplicity of this novel system. A side rail 10 is shown and is the side rail on the opposite of the conveyor preferably from the side rail 10 shown in FIGS. 1, 2 and 3 because it is free from any other mechanism.

Arms 110 are shown as being cut off on the plane represented by line 7—7 on FIG. 3 and looking in the direction of the arrows. Between each two arms 110 another lever 146 is pivoted on a bracket suitably fastened to the side rail 10. Each lever 146 is blunt on the left end and beveled on the right end so that when the arms 110 are up as shown by the first two levers from the left, it indicates that no articles are resting upon their sensor rollers 106 and the drums 40 are up into roller 80 driving position and the blunt ends of these two levers 146 rest against the arms 110 and prevent their sensor rollers 106 from being moved ahead into position to stop the rollers 80 so that articles just roll over the sensor rollers and have no effect on the accumulation mechanism.

However, when an article stops on a sensor roller, its arm 110 moves ahead as shown by arm 110A (see FIG. 7) which permits its arm 146 to be moved blunt end outwardly by the leaf spring 150 suitably fastened to the side rail 10. With the blunt end of this arm 146 being removed from the path of movement of the immediately following arm 110, the sensor roller of the following arm 110 can be moved ahead by an oncoming article to operate its accumulation mechanism and stop the roller 80 rotation controlled by the following arm, and so on down the line as articles approach the accumulation area. This prevents all unnecessary operations of the accumulation machanisms.

When an article moves off of a sensor roller 106, its arm 110 moves back and contacts the bevel of its lever 146 and moves this lever so that its blunt end blocks movement of the adjacent downstream arm 110.

Because of the very high pressure that the drum 40 can exert on the rollers 80, it is practical to drive several additional rollers 80 from one drum 40 by inserting auxiliary rollers 160 between the rollers 80 driven by the drum 40 and auxiliary rollers not driven directly by a drum 40 as shown diagrammatically in FIG. 8.

The extent of the rise and fall of the drum 40 can be controlled by varying the circumference of the bosses 68 and 72 and the circumferences of the pressure wheels 84 and 96 and the number of threads per inch of the screw 66. As an example, and not as any limitation, consider that the rise and fall of the drum 40 to produce good pressure contact between the drum 40 and the rollers 80 and could give clearance between the drum and rollers when disengaged is three eighths of an inch and the thread pitch on the screw 66 is one eighth of an inch. Then the circumference of the bosses 68 and 72 should be one third of the perimeter distance between the points 90 and 92 on wheel 84 and between 102 and 104 on the wheel 96. The desired starting point on the screw 66 for the nut 74 can be obtained by hand turning the screw 66. The resistance of the nut 74 bearing the weight of the blade 76 and the drum 40, etc. prevents the screw 66 from being turned by any vibration.

The "screw-jack" effect of the screw rod 55 and nut 74 in forcing the drum 40 into tight driving contact with the rollers 80 makes it possible to impart any desired driving force of the rollers 90 against any article on the conveyor within the material strengths of the various components involved which can be hundreds of pounds depending on the materials selected for these components. This makes it not only possible but practical to use the present invention for handling pallet conveyors.

The support of a section of the top run of chain 38 by the movable platform 32 provide one means of rotating the drum regardless of its vertical position.

The bosses 84 and 96 provide one means of rotating the screw rod 55 from the chain 38.

The pressure wheels 84 and 96 provide one means for starting the rotation of the screw in the desired nut-up or nut-down direction as well as stopping the screw.

The sensor roller 106, the arm 110, the arms 116, 122, 126, 139, the rod 118, and the fingers 128 and 134a provide a means for connecting the sensor to the screw rod 55 stopping and starting means.

Equivalent forms of these "means" may be used in the novel combination of the present invention.

The present invention is an improvement on the inventions disclosed in applicant's U.S. Pat. Nos. 3,400,806; 3,451,527; 3,589,496; 4,172,519; 4,204,593, and 4,212,385.

The foregoing is to be considered as descriptive of the now preferred embodiment of the present invention and not in any way limitative as many changes and modifications can be made without departing from the basic inventive concept.

The invention having been described, what is claimed is:

1. An article accumulation conveyor comprising a frame, a series of rollers thereon forming a supporting and movement path for the articles being conveyed, a motion transmission drum mounted on the frame for vertical movement into and out of contact with at least one of the rollers, means for rotating the drum regardless of its vertical position, a vertically positioned screw mounted for rotation on the frame, a nut threaded on the screw for vertical movement up or down, a connection between the nut and drum mounting through which the movement of the nut moves the drum into or out of contact with the roller, means for rotating the screw from the drum rotating means, means for starting rotation of the screw in the desired nut up or nut down direction and for stopping the screw at the end of its run as required, a sensor mounted in position to be moved by being contacted by articles moving on the roller conveyor path, and means connecting the sensor and the nut up or down and stopping means to control which of these functions is desired as determined by article positions on the path.

2. In an article accumulation conveyor comprising a frame, a series of rollers carried by the frame and providing a path for carrying and moving the articles, a suitably power driven element extending along the frame, independent motion transmitting means spaced along the frame and each of which can transmit motion from the power driven element at desired times to rotate selected rollers, means for actuating and deactuating the motion transmitting function of the motion transmitting means for each motion transmitting means, roller sensors positioned along the roller article path, one for each of the motion transmitting means, so as to be contacted by articles as they pass along the path, each of the sensor rollers being supported by an arm pivotally mounted on the frame in a generally upright position when its sensor is not contacted by an article and capable of assuming a displaced and lowered position when its sensor is contacted by an article, a connecting means extending from each sensor arm to one of the motion transmission actuating and deactuating means to initiate the actuating and deactivating functions of the motion transmitting means, arms, each having a blunt and a beveled end, pivoted on the frame and each arm extending between each two consecutive sensor arms with the pivot point closer to the downstream, beveled end of the arm than to the upstream blunt end of the arm as denoted by the direction of the article flow along the roller path, springs suitably fastened to the frame and each contacting the arm adjacent to it between the pivot point of the arm and the upstream blunt end of the arm to urge the blunt end of the arm to one side and away from contact with the next upstream sensor arm, which is the position the arm will have when an article is resting on the sensor of the supporting arm at the downstream and beveled end of the arm and in which position the immediate upstream sensor arm is free to move downwardly when another article contacts the sensor roller on that arm which will move the connecting means between that sensor arm and its motion transmitting actuating and deactuating means so as to deactuate the motion transmitting means so that the rollers it can rotate do not rotate to propel articles along the roller path, when an article is not resting on a sensor its supporting arm will be in a position where it has moved against the beveled end on the next upstream arm and moved that arm so that its blunt end will block movement of the next upstream sensor arm when an article contacts its sensor so that the article will roll over the sensor and move on without moving the sensor arm and its connecting means with the motion transmitting actuating and deactuating means so its motion transmitting means will continue to drive rollers and move articles until an article comes to rest on the next downstream sensor which enables articles to move continuously along the conveyor roller path without stopping or actuating any of the foregoing accumulation mechanism until one article is stopped for any reason which will cause all oncoming articles to stop one after the other without crashing tightly together so that article damage is prevented.

3. A conveyor as specified in claim 1 in which the means for rotating the drum comprises a suitably driven chain movable along the frame with one section thereof mounted to also move vertically with the drum and a sprocket rigidly attached to the drum and rotated by the chain.

4. A conveyor as specified in claim 1 in which the means for rotating the screw is a rotatable boss rigidly mounted on the screw and contacting and rotated by the chain which rotates the drum.

5. A conveyor as specified in claim 1 in which the means for starting rotation of the screw in the desired up or down direction and for stopping the screw at end of its run comprises two rotatable bosses, one on each end of the screw and rigidly mounted to rotate with the screw, a mounting for the screw which enables it to freely rotate and also tilt to bring the top boss into driving contact with the upper run of the drum driving chain and to at a different time tilt to bring the bottom boss into contact with the lower run of the chain, a pressure wheel rotatably mounted and shaped so as to contact and move the top boss into contact with the upper run of the chain and release contact with that boss after a predetermined amount of rotation of the boss, and a a second pressure wheel rotatably mounted and shaped so as to contact and move the bottom boss into contact with the lower run of the chain and release contact with that boss after a predetermined amount of rotation of that lower boss.

6. A conveyor as specified in claim 5 in which the means connecting the sensor and the screw up or down and stopping means comprises an arm supporting the sensor and pivotally mounted on the frame, an arm pivotally attached to the sensor support arm and which branches into two arms near the two pressure wheels, one branch terminating near the upper wheel, a finger pivoted on that branch and which contacts the upper wheel so that when an article moves off of the sensor the sensor and its arm will move upstream of the article flow and the finger will rotate the wheel into contact with the upper boss and rotate it and the screw and move the nut up to move the drum and drive the rollers, the other branch terminates near the lower wheel, a finger pivoted on this other branch and contacts the lower wheel so that when an article moves on the sensor and stops, the sensor and its arm will move downstream of the article flow and the finger will rotate the lower pressure wheel in the opposite direction from the upper wheel rotation and that wheel will contact and rotate the lower boss and rotate it and the screw and move the nut down to move the drum down out of contact with the rollers so that the article remains on the sensor.

7. A conveyor as specified in claim 5 in which the bosses contact the chain on the side of the chain.

8. A conveyor as specified in claim 1 in which the screw and nut have left-hand threads.

9. A conveyor as specified in claim 6 in which the arm branch which terminates near the upper wheel is mounted so that it can move vertically relative to the other branch with the drum but moves laterally with the other branch.

10. An article accumulation conveyor comprising a frame, rollers mounted on the frame for supporting and moving the articles, roller rotating means mounted on the frame for movement into and and out of contact with the rollers, a screw-jack mounted in position to move the roller rotating means both into and out of contact with the rollers, means for actuating the screw-jack from the roller rotating means in both directions, a sensor mounted in position to be moved by being contacted by articles moving on the article supporting rollers, and means connecting the sensor and the screw-jack actuating means to control the actuation and direction of actuation of the screw-jack.

* * * * *

UNITED STATES PATENT AND TRADEMARK OFFICE
CERTIFICATE OF CORRECTION

PATENT NO. : 4,524,862

DATED : June 25, 1985

INVENTOR(S) : John M. Leach

It is certified that error appears in the above-identified patent and that said Letters Patent is hereby corrected as shown below:

Column 1, line 12, by inserted after "provided".

Column 5, line 24, "112" chnaged to 122 ; line 47, "134" changed to 143.

Signed and Sealed this

Eighth Day of October 1985

[SEAL]

Attest:

Attesting Officer

DONALD J. QUIGG

Commissioner of Patents and Trademarks—Designate